US008155771B2

(12) United States Patent  
Omata

(10) Patent No.: US 8,155,771 B2
(45) Date of Patent: Apr. 10, 2012

(54) DISK PROCESSING APPARATUS

(75) Inventor: Hiroyuki Omata, Tokorozawa (JP)

(73) Assignee: TEAC Corporation, Tama-shi, Tokyo (JP)

( * ) Notice: Subject to any disclaimer, the term of this patent is extended or adjusted under 35 U.S.C. 154(b) by 463 days.

(21) Appl. No.: 12/050,868

(22) Filed: Mar. 18, 2008

(65) Prior Publication Data

US 2008/0232936 A1    Sep. 25, 2008

(30) Foreign Application Priority Data

Mar. 19, 2007    (JP) ................. 2007-070464

(51) Int. Cl.
*G06F 19/00* (2006.01)

(52) U.S. Cl. ............ 700/100; 414/270; 414/274; 347/4

(58) Field of Classification Search .................. 414/266, 414/270, 273, 274, 275; 347/4; 700/100, 700/213

See application file for complete search history.

(56) References Cited

U.S. PATENT DOCUMENTS

| | | | | |
|---|---|---|---|---|
| 5,668,733 | A * | 9/1997 | Morimoto et al. .............. 716/19 |
| 6,584,369 | B2 * | 6/2003 | Patel et al. .................... 700/100 |
| 7,559,731 | B2 * | 7/2009 | Gretsch et al. ................ 414/273 |
| 2005/0149217 | A1 | 7/2005 | Okada et al. | |
| 2006/0130751 | A1 * | 6/2006 | Volfovski et al. ............. 118/300 |

FOREIGN PATENT DOCUMENTS

| | | |
|---|---|---|
| JP | 1274956 A | 11/1989 |
| JP | 6282885 A | 10/1994 |
| JP | 7044614 A | 2/1995 |
| JP | 8181184 A | 7/1996 |
| JP | 10050794 A | 2/1998 |
| JP | 2004-95064 A | 3/2004 |
| JP | 2005-131954 A | 5/2005 |
| JP | 2005182901 A | 7/2005 |
| JP | 2005197500 A | 7/2005 |

OTHER PUBLICATIONS

Japanese Office Action in Corresponding JP Application No. 2007-070464, mailed Apr. 19, 2011, 4 pages.

* cited by examiner

*Primary Examiner* — Scott Lowe
(74) *Attorney, Agent, or Firm* — Seed IP Law Group PLLC

(57) ABSTRACT

A disk processing apparatus having a plurality of processing units, a plurality of feed stackers, and a plurality of discharge stackers. The plurality of processing units subject label sides of disks to printing, or the like. A disk is fed from a first prior-to-being-printed stacker to the processing unit, and a processed disk is discharged to a first processed stacker. A disk is fed from a second prior-to-being-printed stacker to the other processing unit, and a processed disk is discharged to a second processed stacker. When the other processing unit is anomalous, the disk is fed from the second prior-to-being-printed stacker to the processing unit, and a processed disk is discharged to the second processed stacker, thereby performing substitute processing.

2 Claims, 3 Drawing Sheets

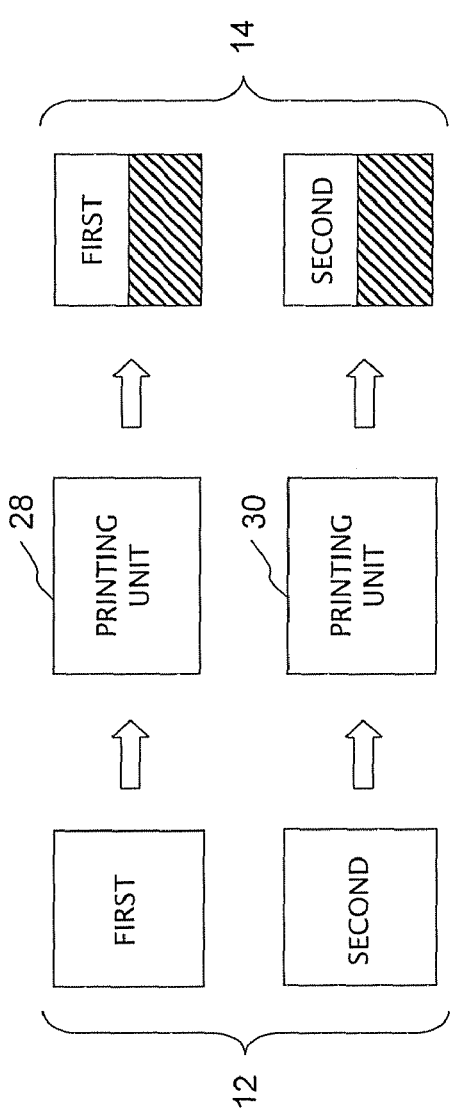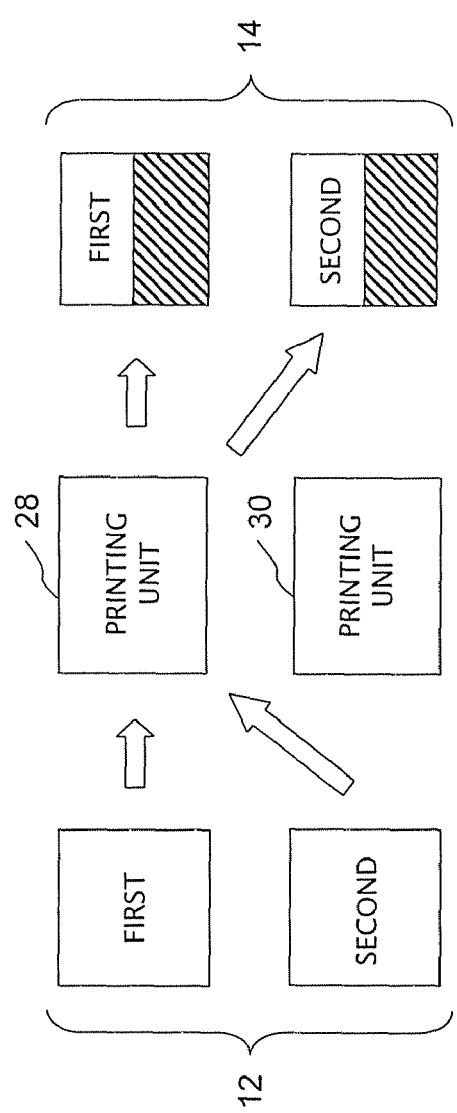

US 8,155,771 B2

DISK PROCESSING APPARATUS

PRIORITY INFORMATION

This application claims priority to Japanese Patent Application No. 2007-070464 filed on Mar. 19, 2007 which is incorporated herein by reference in its entirety.

BACKGROUND

1. Technical Field

The present invention relates to a disk processing apparatus, and more particularly to control performed when a disk processing apparatus having a plurality of processing units is anomalous.

2. Related Art

A hitherto-known printer stores a plurality of disks in a feed stacker; continually subjects the disks to label printing; and discharges printed disks to a discharge stacker.

JP 2004-095064 A describes an optical disk processing system having a stacker case for storing a plurality of virgin optical disks in a stacked state and a recovery case for storing processed optical disks, wherein an optical disk is subjected to label printing.

There is no such a processing system equipped with a plurality of printing units. When large numbers of disk are printed, there is no alternative way but to connect a plurality of separate printers by means of a network, to thus perform parallel processing. When an error, such as ink depletion, arises in any of the printers in the middle of parallel processing, another normal printer cannot perform, in place of the error-generated printer, a print job which would have been processed by the error-generated printer. Consequently, a disk which would have been output from the error-generated printer is not output, which in turn results in a deficiency of disks.

Therefore, a system equipped with a plurality of printing units is desired. However, a mere aggregation of a plurality of related-art printers, each of which has only one printing unit, leads to substitute processing being performed while disks are supplied or discharged from stackers of normal printing units. Since the number of disks that can be held in each of the stackers is limited, even substitute processing may cause a deficiency, such as a deficiency of supplied disks, filling of the discharge stacker, and the like. Moreover, there is also a case where the type of a disk to be subjected to print processing changes from one printing unit to another, and hence there may be a problem of an inappropriate disk being printed.

SUMMARY

The present invention provides a disk processing apparatus that has a plurality of processing units, such as printing units, and that can cause another normal processing unit to perform substitute processing without fail even when an anomaly arises in any of the processing units.

The present invention is directed toward a disk processing apparatus comprising:

a plurality of processing units that subject disks to predetermined processing;

feed stackers that are provided for the respective processing units and that store virgin disks;

discharge stackers that are provided for the respective processing units and that store processed disks; and a transport mechanism for transporting a disk between the processing unit and the feed stacker and between the processing unit and the discharge stacker, wherein, when any of the plurality of processing units becomes unable to perform processing, another normal processing unit performs processing instead of that unit; and the transport mechanism transports a disk between the feed stacker and the discharge stacker assigned to the processing unit having become unable to perform processing and the processing unit that performs processing in place of that unit.

In one embodiment, the feed stackers comprise a lower first feed stacker and an upper second feed stacker; and the discharge stackers comprise a lower first discharge stacker and an upper second discharge stacker, wherein the transport mechanism has a transport arm that freely ascends or descends along vertically-standing guide shafts;

when all of the plurality of processing units are capable of performing processing, a disk is taken out of the second feed stacker by means of ascending or descending action of the transport arm and fed to the second processing unit; the disk is taken out of the second processing unit after having undergone processing and discharged to the second discharge stacker; a disk is taken out of the first feed stacker by means of ascending or descending action of the transport arm and fed to the first processing unit; and the disk is taken out of the first processing unit after having undergone processing and discharged to the first discharge stacker;

when the second processing unit of the plurality of processing units becomes unable to perform processing, a disk is taken out of the second feed stacker by means of ascending or descending action of the transport arm and fed to the first processing unit; and the disk is taken out of the first processing unit after having undergone processing and discharged to the second discharge stacker; and when the first processing unit of the plurality of processing units becomes unable to perform processing, a disk is taken out of the first feed stacker by means of ascending or descending action of the transport arm and fed to the second processing unit; and the disk is taken out of the second processing unit after having undergone processing and discharged to the first discharge stacker.

BRIEF DESCRIPTION OF THE DRAWINGS

Preferred embodiments of the present invention will be described in detail by reference to the following drawings, wherein:

FIG. 2A is a descriptive view of processing performed in normal operation of the disk printer of the embodiment;

FIG. 2B is a descriptive view of processing performed in anomalous operation of the disk printer of the embodiment.

DETAILED DESCRIPTION

By reference to the drawings, an embodiment of the present invention will be described hereinbelow by means of taking as an example disk processing apparatus a disk printer having a printing unit for subjecting a label side (a label) of a disk to printing.

Figure 1:
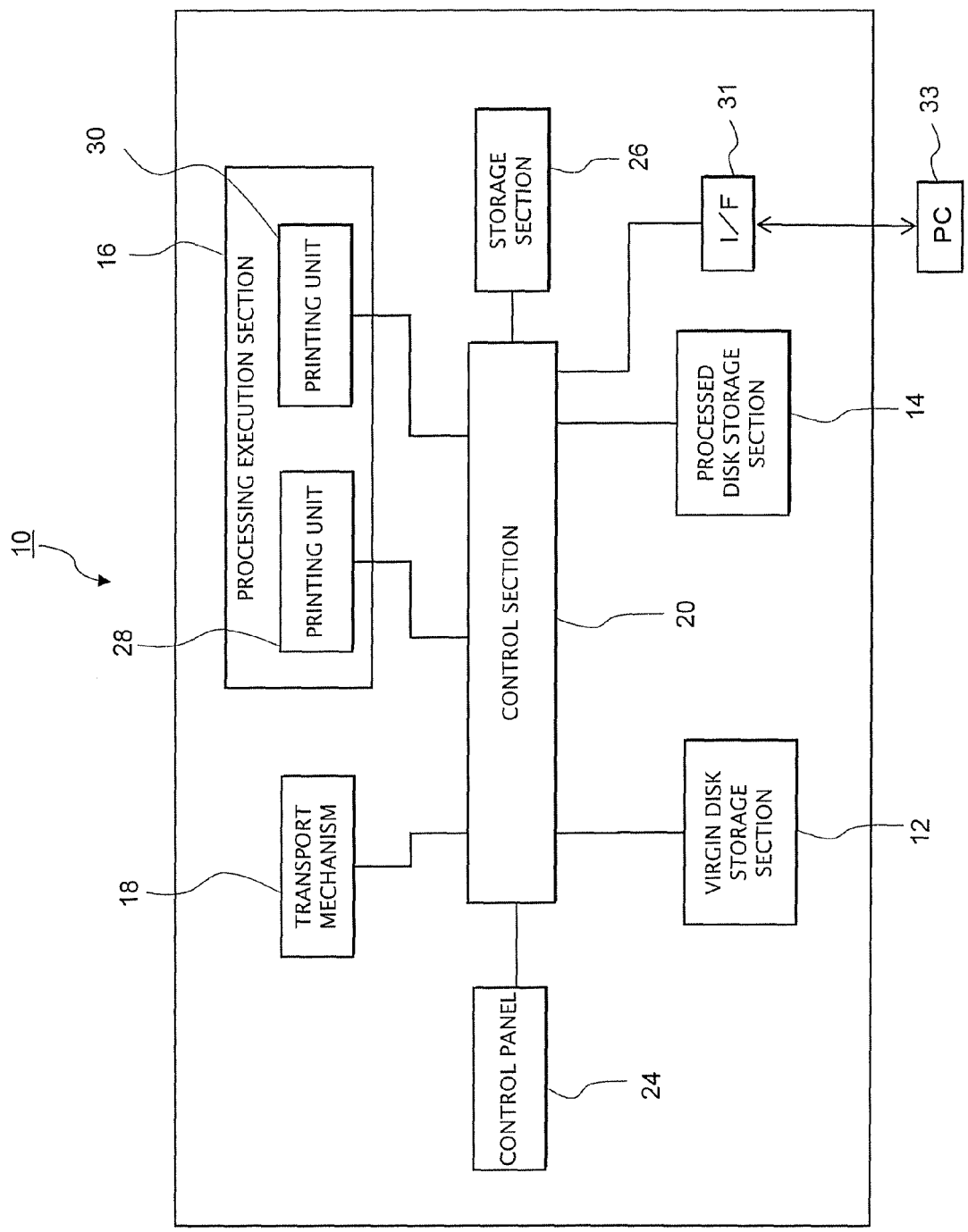
FIG. 1 is a block diagram of the structure of a disk printer of an embodiment.

FIG. 1 shows a block diagram of the configuration of a disk printer of the embodiment. A disk printer 10 has a virgin disk storage section 12; a processed disk storage section 14; and a processing execution section 16. A virgin disk stored in the virgin disk storage section 12; namely, a yet-to-be-printed disk, is taken out by a transport mechanism 18, and the disk is fed to the processing execution section 16. The processing execution section 16 prints an image on the label side (label) of the disk. The transport mechanism 18 takes a processed disk; namely, a printed disk, out of the processing execution section 16 and discharges the disk to the processed disk storage section 14. Transporting operation of the transport mechanism 18 and print processing of the processing execution section 16 are controlled by a control section 20 in accordance with an operation signal from a control panel 24. Conditions for continual printing, or the like, input by way of the control panel 24 are stored in a storage section 26, and the control section 20 controls the transport mechanism 18 and the processing execution section 16 in accordance with conditions stored in the storage section 26. The control section 20 is connected, by way of an interface I/F 31, to a personal computer (PC) 33 located outside the printer. A command is sent from the personal computer 33 to the control section 20, so that the personal computer 33 becomes able to control operation of the disk printer.

The processing execution section 16 has two printing units 28 and 30, and print processing can be executed parallelly by means of driving the printing units 28 and 30 simultaneously. Each of the virgin disk storage section 12 and the processed disk storage section 14 is made up of two units (stackers) in correspondence with the two printing units 28 and 30. Specifically, the virgin disk storage section 12 is made up of two stackers (they will be hereinafter referred to as a "first prior-to-being-printed stacker" and a "second prior-to-being-printed stacker"). The first prior-to-being-printed stacker is assigned to the printing unit 28, and the second prior-to-being-printed stacker is assigned to the printing unit 30. The processed disk storage section 14 is also made up of two stackers (they will be hereinafter referred to as a "first printed stacker" and a "second printed stacker"). The first printed stacker is assigned to the printing unit 28, and the second printed stacker is assigned to a printing unit 30. The transport mechanism 18 takes a virgin disk from the first prior-to-being-printed stacker and feeds the thus-taken disk to the printing unit 28. A printed disk is taken out of the printing unit 28, and the disk is discharged to the first printed stacker. Moreover, the transport mechanism 18 takes the virgin disk out of the second prior-to-being printed stacker and feeds the disk to the printing unit 30; and takes a printed disk out of the printing unit 30 and discharges the disk to the second printed stacker.

Operating statuses of the printing units 28 and 30 are controlled by the control section 20. When any one of the printing units 28 and 30 becomes unable to perform printing for any reason, the anomaly is detected, and a message to this effect is output to the personal computer 33 by way of the interface I/F 31. A predetermined error message may also be displayed on a display section of the control panel 24. Concurrently, the control section 20 causes a normal printing unit, which has no anomaly, of the printing units 28 and 30 to perform substitute processing in accordance with a predetermined processing program for anomaly condition.

FIGS. 2A and 2B show processing for normal conditions (hereinafter called "normal processing") and processing for anomalous conditions (hereinafter called "anomalous processing") of the present embodiment. FIG. 2A shows processing performed in a case where both two printing units 28 and 30 are able to perform printing normally, and FIG. 2B shows processing performed in a case where the printing unit 30 of the two printing units 28 and 30 has become unable to perform printing in the middle of print processing. As shown in FIG. 2A, a virgin disk is fed, under normal conditions, from the first prior-to-being-printed stacker of the virgin disk storage section 12 to the printing unit 28 by means of the transport mechanism 18. A printed disk is discharged from the printing unit 28 to the first printed stacker of the processed disk storage section 14. Moreover, a printed disk is fed from the second prior-to-being stacker of the virgin disk storage section 12 to the printing unit 30, and the printed disk is discharged from the printing unit 30 to the second printed stacker of the processed disk storage section 14.

In the meantime, under anomalous conditions; for example, when the printing unit 30 is unable to perform printing as shown in FIG. 2B, the transport mechanism 18 feeds a virgin disk from the second prior-to-being-printed stacker of the virgin disk storage section 12 to the printing unit 28, and the printed disk is discharged from the printing unit 28 to the second printed stacker of the processed disk storage section 14. Processing performed by the printing unit 28 in place of the printing unit 30 is carried out after performance of processing unique to the printing unit 28; namely, after all virgin disks stored in the first prior-to-being-printed stacker have finished undergoing printing and after printed disks have been discharged to the first printed stacker. As a result, even when the printing unit 30 becomes unable to perform printing, a virgin disk stored in the second prior-to-being-printed stacker is subjected to printing, and a printed disk can be discharged to the second printed stacker. Accordingly, an originally-scheduled number of disks can be subjected to printing without involvement of an excess or a deficiency.

When an image to be printed by the printing unit 28 differs from an image to be printed by the printing unit 30, it goes without saying that, when performing processing in place of the printing unit 30 after detection of an anomaly in the printing unit 30, the control section 20 feeds to the printing unit 28 data pertaining to an image which is to be printed by the printing unit 30. When data pertaining to a print image are stored in the storage section 26, an essential requirement for the control section 20 is to read print image data for the printing unit 30 from the storage section 26 and feed the thus-read data to the printing unit 28.

The present embodiment is described in more detail hereunder.

Figure 3:
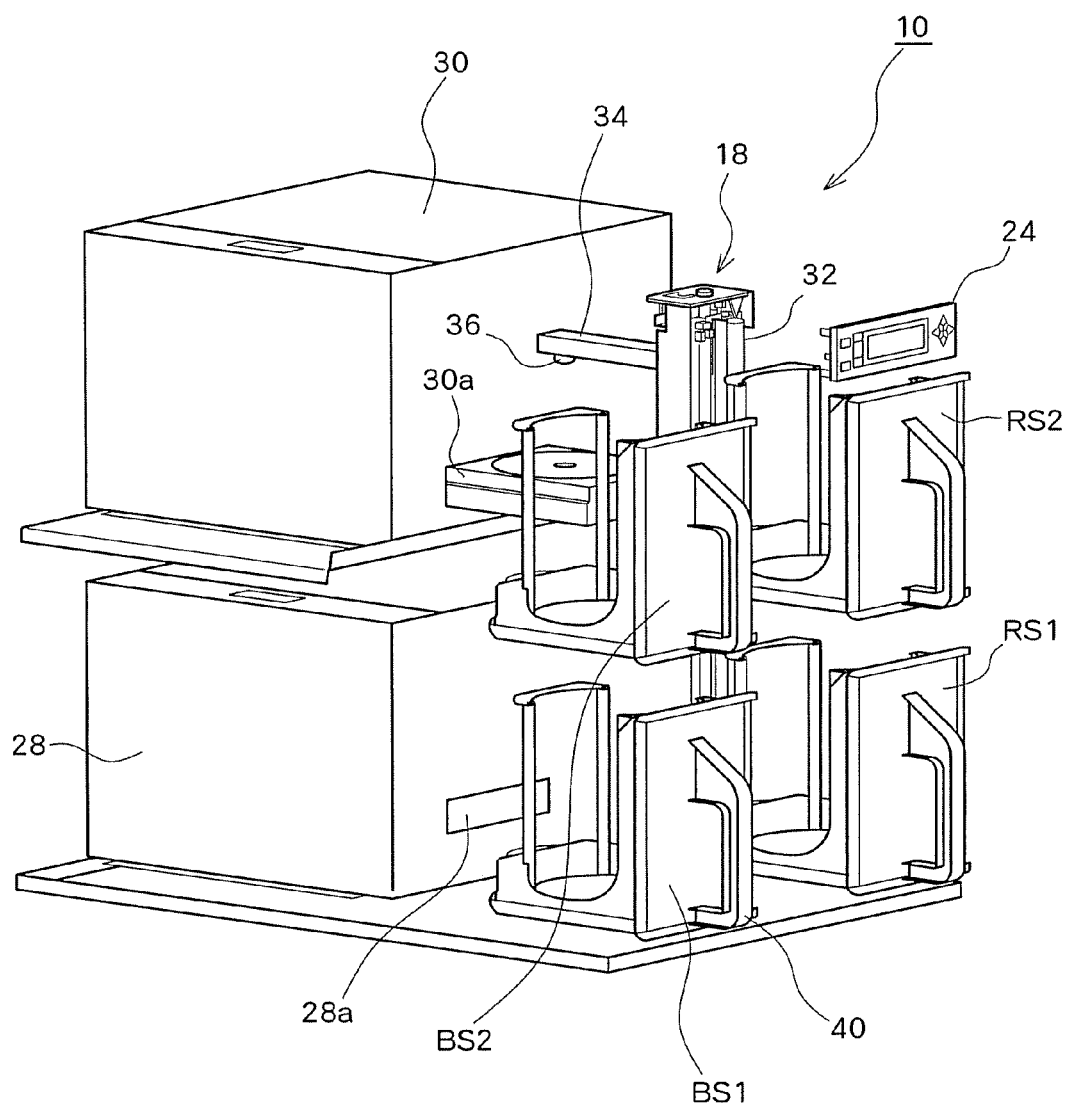
FIG. 3 is a block diagram of the disk printer of the embodiment.

FIG. 3 shows the configuration of the disk printer of the present embodiment. For the sake of explanation, an outer housing is omitted.

The two printing units 28 and 30, which constitute the processing execution section 16, are arranged in a vertical layout within the printer. The processing unit 28 has a retractable disk tray 28a, and the processing unit 30 has a retractable disk tray 30a. A disk placed on the disk tray is transported to the inside of the unit. The transport mechanism 18 feeds and discharges disks to and from the processing units 28 and 30.

The transport mechanism 28 has a guide shaft 32 standing upright; a transport arm 34 that freely ascends or descends along the guide shaft 32 and that freely pivots around the guide shaft 32; and a clamper 36 provided at the extremity of the transport arm 34. The control section 20 causes the transport arm 34 to ascend, descend, or pivot along the guide shaft 32, thereby moving the clamper 36 to a desired location. The clamper 36 holds a disk or release a disk. A contact sensor that detects a contact with another member is provided in the vicinity of the clamper 36. The contact sensor is used for detecting the number of disks held in respective stackers BS1, BS2, RS1, and RS2 to be described later. When detecting the number of stored disks, the control section 20 gradually lowers the transport arm 34 from a position above a target stacker. When the contact sensor cannot detect a contact with another member until the arm reaches the lowermost end of the target stacker, no disks are determined to be held in the target stacker. In the meantime, when a contact with another member is detected before the arm reaches the lowermost end of the target stacker, the height of a layer into which the disks stored in the target stacker are piled; namely, the number of disks, can be computed from a position of the contact.

The stackers BS1 and BS2 and the stackers RS1 and RS2 are provided on the front side of the printer. The stacker BS1 is assigned to the first prior-to-being-printed stacker; the stacker BS2 is assigned to the second prior-to-being-printed stacker; the stacker RS1 is assigned to the first processed stacker; and the stacker RS2 is assigned to the second processed stacker. The stacker BS1 and the stacker BS2 are vertically arranged, and the stacker RS1 and the stacker RS2 are also arranged in the vertical direction. The stackers BS1, BS2, RS1, and RS2 are identical in configuration with each other. For instance, the stacker BS1 is a member assuming an essentially-L-shaped longitudinal cross-sectional profile and configured in such a way that the user can removably attach the stacker to a main unit of the printer, as required. A grip 40 to be held by the user at the time of removal or insertion of the stacker is attached to the front of the stacker BS1. Outer peripheral shafts defining an outer position of a disk to be stored stand in the vicinity of four corners of the stacker BS1. The transport arm 34 ascends or descends at a position where the arm does not interfere with the outer peripheral shafts, thereby detecting the number of held disks and transporting a disk. The control panel 24 is provided at a front panel of the printer.

By means of such a configuration, print processing is performed as follows. Specifically, virgin disks are first stored in the stackers BS1 and BS2. When a print start is commanded by way of the control panel 24, the transport arm 34 takes a virgin disk out of the upper stacker BS2 and places the virgin disk on the disk tray 30a of the upper printing unit 30. The printing unit 30 transports the virgin disk into the unit and performs print processing. During the course of the printing unit 30 performing print processing, the transport arm 34 moves downwardly, to thus take a virgin disk from the lower stacker BS1 and place the virgin disk on the disk tray 28a of the lower printing unit 28. The printing unit 28 transports the virgin disk into the unit and performs print processing. Subsequently, the transport arm 34 moves upwardly.

During the course of the printing unit 28 performing print processing, print processing of the printing unit 30 is completed. Hence, the transport arm 34 takes a printed disk out of the disk tray 30a of the printing unit 30 and discharges the disk to the upper stacker RS2. Subsequently, the transport arm 34 takes a virgin disk out of the upper stacker BS2 and places the disk on the disk tray 30a of the upper printing unit 30. The printing unit 30 transports the virgin disk into the unit and again performs print processing.

During the course of the printing unit 30 performing print processing, print processing of the printing unit 28 is completed. Since the upper printing unit 30 is in the middle of printing, the disk tray 30a remains receded in the unit. Accordingly, the transport arm 34 moves downwardly without interfering with the disk tray 30a of the upper printing unit 30; takes a printed disk out of the disk tray 28a of the printing unit 28; and discharges the disk to the lower stacker RS1. Subsequently, the transport arm 34 takes a virgin disk out of the lower stacker BS1 and places the disk on the disk tray 28a of the lower printing unit 28. Since the upper printing unit 30 still remains in the middle of printing operation, the transport arm 34 moves upwardly without interfering with the disk tray 30a and waits until print processing of the printing unit 30 is completed. By means of repetition of above processing, the printing units 28 and 30 can perform print processing.

When the upper printing unit 30 completes print processing after having placed the virgin disk on the disk tray 28a of the lower printing unit 28, the disk tray 30a of the upper printing unit 30 must wait for open processing until the transport arm 34 ascends in excess of the height of the disk tray 30a. If not, the transport arm 34 interferes with the disk tray 30a, to thus fail to ascend and proceed to the next action. It is desirable that the disk tray 28a of the lower printing unit 28 continually remain open until the next virgin disk is placed after removal of the printed disk.

In sum, time-series processing, such as that provided below, is performed.

(1) Take a disk out of the stacker BS2.
(2) Feed a disk to the printing unit 30 (→Close the disk tray 30a).
(3) Move the transport arm 34 downwardly and take a disk out of the stacker BS1.
(4) Feed a disk to the printing unit 28 (→Close the disk tray 28a).
(5) Move the transport arm 34 upwardly before opening of the disk tray 30a.
(6) Take a disk out of the printing unit 30.
(7) Discharge a disk to the stacker RS2.
(8) Take a disk out of the stacker BS2.
(9) Feed a disk to the printing unit 30 (→Close the disk tray 30a).
(10) Move the transport arm 34 downwardly and take a disk out of the printing unit 28.
(11) Discharge a disk to the stacker RS1.
(12) Take a disk out of the stacker BS1.
(13) Feed a disk to the printing unit 28 (→Close the disk tray 28a).
(14) Move the transport arm 34 upwardly before opening of the disk tray 30a.
(15) Take a disk out of the printing unit 30.

In the meantime, when the lower printing unit 28 becomes unable to perform printing, the control section 20 first completes all print processing procedures scheduled by the printing unit 30. Specifically, (A1) Take a disk out of the stacker BS2.
(A2) Feed a disk to the printing unit 30 (→Close the disk tray 30a).
(A3) Take the disk out of the printing unit 30 after printing
(A4) Discharge the disk to the stacker RS2.
All of the disks stored in the stacker BS2 are printed by means of sequential repetition of above processing steps, and the printed disks are stored in the stacker RS2. Subsequently, (A5) Close the disk tray 30a.
(A6) Take a disk out of the stacker BS1 and move the transport arm 34 upwardly.
(A7) Feed a disk to the printing unit 30 (→Close the disk tray 30a).
(A8) Take the disk out of the printing unit 30 after printing.
(A9) Close the disk tray 30a.
(A10) Move the transport arm 34 downwardly and discharge the disk to the stacker RS1.
All of the disks stored in the stacker BS1 are printed by means of sequential repetition of above processing steps, and the printed disks are stored in the stacker RS1.

Further, when the upper printing unit 30 becomes unable to perform printing, the control section 20 first completes all print processing procedures scheduled by the printing unit 28. Specifically, (B1) Take a disk out of the stacker BS1.

(B2) Feed a disk to the printing unit 28 (→Close the disk tray 28a).

(B3) Take the disk out of the printing unit 28 after printing (B4) Discharge the disk to the stacker RS1.

All of the disks stored in the stacker BS1 are printed by means of sequential repetition of above processing steps, and the printed disks are stored in the stacker RS1. Subsequently, when the transport arm 34 is moved upwardly, (B5) Take a disk out of the stacker BS2.

(B6) Move the transport arm 34 downwardly and feed the disk to the printing unit 28 (→Close the disk tray 28a).

(B7) Take the disk out of the printing unit 28 after printing.

(B8) Move the transport arm 34 upwardly and discharge the disk to the stacker RS2.

All of the disks stored in the stacker BS2 are printed by means of sequential repetition of above processing steps, and the printed disks are stored in the stacker RS2. In this case, processing is based on the premise that the disk tray 30a is closed.

When the disk tray 30a is held in an open state rather than the printer merely becoming unable to perform printing as a result of occurrence of an anomaly in the upper printing unit 30, the transport arm 34 interferes with the disk tray 30a, whereby ascending and descending operations of the transport arm are restricted. Therefore, an access cannot be made to the stackers BS2 and RS2. In this case, the stacker BS2 and the stacker RS2 are made invalid, and processing pertaining to (B1) to (B4) is iterated during substitute processing, whereupon deficiencies are compensated for by use of only the lower stackers BS1 and RS1. Specifically, backup disks are stored in the stacker BS1, and the printing unit 28 prints virgin disks of the invalidated stacker BS2 through use of the backup disks, and the thus-printed disks are discharged to the stacker RS1. For instance, a sensor for detecting a collision with the disk tray 30a is provided on the transport arm 34, and the printing unit 30 is provided with a sensor that renders a determination in accordance with a result of detection of the sensor or that detects opening/closing action of the disk tray 30a. On the basis of a detection result output from the sensor when the transport arm 34 is moved upwardly, a determination is made as to whether or not the printing unit 30 is unable to perform printing with the disk tray 30a open. Moreover, when given or more torque is required to move the transport arm 34 upwardly, the disk tray can also be determined to be open.

As described above, in the disk printer of the present embodiment, even when any of the printing units 28 and 30 becomes unable to perform printing, another printing unit performs print processing instead of that printing unit, so that a scheduled number of disks can be printed.

In the present embodiment, amounts of consumable materials remaining in the printing units 28 and 30 may be monitored instead of substitute print processing being performed at a point in time when the printer actually becomes unable to perform printing, and substitute print processing may also be performed in accordance with the amounts of remaining materials and print image data before actual depletion of the material. Specifically, when the printing unit(s) is forecast to become unable to perform printing in near future on the basis of the amounts of consumable materials remaining in the printing units and print image data, substitute print processing may also be performed prior to a point in time when the printing unit (s) actually becomes unable to perform print processing. Further, when disks remain held in the printing unit having become unable to perform printing, the disks may be taken out of the disk tray of the printing unit incapable of performing printing operation after printing of all of the disks is completed. The thus-taken disks may also be discharged as erroneously-printed disks to the stacker RS1 or RS2 (preferably to a stacker to which disks undergone substitute processing are to be discharged). In this case, the disks may also be discharged to the stacker RS1 or RS2 after being given through printing a mark showing an erroneously-printed disk, or the like, by a normal printing unit.

The present embodiment has been described by means of taking, as an example, a disk processing apparatus having, as processing units, a plurality of printing units that subject a label side of a disk to printing. However, the present invention can also be applied to a disk processing apparatus having, as processing units, a plurality of write drives that perform processing for writing data on a disk.

What is claimed is:

1. A disk processing apparatus comprising:

a plurality of processing units configured to perform processing on disks;

feed stackers associated with respective ones of the processing units and configured to store virgin disks;

discharge stackers associated with the respective ones of the processing units and configured to store processed disks; and a transport mechanism configured to transport the disks between the processing unit and the feed stacker, and between the processing unit and the discharge stacker, wherein, when any of the plurality of processing units becomes unable to perform the processing on a respective disk, another normal processing unit performs the processing in place of that unit, and the transport mechanism transports the respective disk between a feed stacker and a discharge stacker associated with the processing unit having become unable to perform processing and processing unit that performs processing in place of that unit;

the plurality of processing units comprise a lower first processing unit and an upper second processing unit which are arranged one above the other;

the feed stackers comprise a lower first feed stacker and an upper second feed stacker which are arranged one above the other;

the discharge stackers comprise a lower first discharge stacker and an upper second discharge stacker;

the transport mechanism has a transport arm that freely ascends and descends along vertically-standing guide shafts;

when all of the plurality of processing units are able to perform processing, a first disk is taken out of the second feed stacker by means of an ascending or descending action of the transport arm and fed to the second processing unit; the first disk is taken out of the second processing unit after having undergone processing and discharged to the second discharge stacker; a second disk is taken out of the first feed stacker by means of the ascending or descending action of the transport arm and fed to the first processing unit; and the second disk is taken out of the first processing unit after having undergone processing and discharged to the first discharge stacker;

when the second processing unit among the plurality of processing units becomes unable to perform processing, a third disk is taken out of the second feed stacker by means of the ascending or descending action of the transport arm and fed to the first processing unit; and the third disk is taken out of the first processing unit after having undergone processing and discharged to the second discharge stacker;

when the first processing unit among the plurality of processing units becomes unable to perform processing, a fourth disk is taken out of the first feed stacker by means of the ascending or descending action of the transport arm and fed to the second processing unit; and the fourth disk is taken out of the second processing unit after having undergone processing and discharged to the first discharge stacker; and when the second processing unit among the plurality of processing units becomes unable to perform processing and when the transport arm becomes unable to perform the ascending or descending action because of interference with the second processing unit, the transport mechanism takes backup disks still remaining in the first feed stacker out of the first feed stacker and feeds the backup disks to the first processing unit and takes the backup disks out of the first processing unit after having undergone processing and discharges the backup disks to the first discharge stacker.

2. A disk processing apparatus comprising:

a plurality of processing units configured to perform processing on disks;

feed stackers associated with respective ones of the processing units and configured to store virgin disks;

discharge stackers associated with the respective ones of the processing units and configured to store processed disks; and a transport mechanism configured to transport the disks between the processing unit and the feed stacker, and between the processing unit and the discharge stacker, wherein, when any of the plurality of processing units becomes unable to perform the processing on a respective disk, another normal processing unit performs the processing in place of that unit, and the transport mechanism transports the respective disk between a feed stacker and a discharge stacker associated with the processing unit having become unable to perform processing and the processing unit that performs processing in place of that unit;

the plurality of processing units comprise a lower first processing unit and an upper second processing unit which are arranged one above the other;

the feed stackers comprise a lower first feed stacker and an upper second feed stacker which are arranged one above the other;

the discharge stackers comprise a lower first discharge stacker and an upper second discharge stacker which are arranged one above the other;

the transport mechanism has a transport arm that freely ascends and descends along vertically-standing guide shafts;

when all of the plurality of processing units are able to perform processing, a first disk is taken out of the second feed stacker by means of an ascending or descending action of the transport arm and fed to the second processing unit; the first disk is taken out of the second processing unit after having undergone processing and discharged to the second discharge stacker; a second disk is taken out of the first feed stacker by means of the ascending or descending action of the transport arm and fed to the first processing unit; and the second disk is taken out of the first processing unit after having undergone processing and discharged to the first discharge stacker;

when the second processing unit among the plurality of processing units becomes unable to perform processing, first, an action of taking a disk out of the first feed stacker and feeding the disk to the first processing unit and taking the disk out of the first processing unit after having undergone processing and discharging the disk to the first discharge stacker is repeated to process all the virgin disks stored in the first feed stacker, and then, a third disk is taken out of the second feed stacker by means of the ascending or descending action of the transport arm and fed to the first processing unit, and the third disk is taken out of the first processing unit after having undergone processing and discharged to the second discharge stacker; and when the first processing unit among the plurality of processing units becomes unable to perform processing, first, an action of taking a disk out of the second feed stacker and feeding the disk to the second processing unit and taking the disk out of the second processing unit after having undergone processing and discharging the disk to the second discharge stacker is repeated to process all the virgin disks stored in the second feed stacker, and then, a fourth disk is taken out of the first feed stacker by means of the ascending or descending action of the transport arm and fed to the second processing unit and the fourth disk is taken out of the second processing unit after having undergone processing and discharged to the first discharge stacker.

* * * * *